(12) United States Patent
Florencio et al.

(10) Patent No.: US 8,640,231 B2
(45) Date of Patent: Jan. 28, 2014

(54) CLIENT SIDE ATTACK RESISTANT PHISHING DETECTION

(75) Inventors: Dinei A. Florencio, Redmond, WA (US); Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1437 days.

(21) Appl. No.: 11/360,254

(22) Filed: Feb. 23, 2006

(65) Prior Publication Data

US 2007/0199054 A1 Aug. 23, 2007

(51) Int. Cl.
 *G06F 21/00* (2013.01)
(52) U.S. Cl.
 USPC .......... 726/22; 726/2; 726/3; 726/5; 713/184; 709/206; 709/224; 705/14
(58) Field of Classification Search
 USPC ...................................... 726/22, 23
 See application file for complete search history.

(56) References Cited

U.S. PATENT DOCUMENTS

| | | | |
|---|---|---|---|
| 6,044,152 A | 3/2000 | Mendolia | |
| 6,104,916 A | 8/2000 | Steinhoff et al. | |
| 6,185,689 B1 * | 2/2001 | Todd et al. | 726/25 |
| 6,230,269 B1 | 5/2001 | Spies et al. | |
| 6,662,300 B1 | 12/2003 | Peters | |
| 6,754,507 B2 | 6/2004 | Takagi | |
| 6,826,697 B1 * | 11/2004 | Moran | 726/23 |
| 6,845,380 B2 | 1/2005 | Su et al. | |
| 6,848,078 B1 | 1/2005 | Birsan et al. | |
| 6,925,313 B2 | 8/2005 | Kweon et al. | |
| 7,152,244 B2 | 12/2006 | Toomey | |
| 7,159,120 B2 * | 1/2007 | Muratov et al. | 713/182 |
| 7,475,135 B2 * | 1/2009 | Bantz et al. | 709/224 |
| 7,487,541 B2 * | 2/2009 | Robert | 726/22 |
| 2001/0039579 A1 * | 11/2001 | Trcka et al. | 709/224 |
| 2002/0078381 A1 * | 6/2002 | Farley et al. | 713/201 |

(Continued)

FOREIGN PATENT DOCUMENTS

| | | |
|---|---|---|
| EP | 1413980 A1 | 4/2004 |
| JP | 14-073553 A | 3/2002 |

(Continued)

OTHER PUBLICATIONS

Malware Remover, "Phishing Sweeper Enterprise", http://www.programurl.com/phishing-sweeper-enterprise.htm (2 of 4), Date Released: May 6, 2005.*

(Continued)

*Primary Examiner* — Morshed Mehedi
(74) *Attorney, Agent, or Firm* — Lee & Hayes, PLLC

(57) ABSTRACT

A phishing detection client component and method is provided. The component can be employed as part of a system to detect and, optionally, prevent phishing attacks. The phishing detection client component can provide password reuse event report(s), for example, to a phishing detection server component.

The client component can further include a credential component that can track use of credentials by a user and determine whether a specific security credential is being used or presented.

Due to the malicious nature of phishing in general, the client component can be susceptible to attacks by phishers. For example, phishers can generate false logins in an attempt to flood the client component with information resulting in induced false positives and/or induced false negatives. The client component can perform one or more checks to determine whether false login(s) have been attempted.

16 Claims, 8 Drawing Sheets

(56) References Cited

U.S. PATENT DOCUMENTS

| | | | |
|---|---|---|---|
| 2003/0023876 | A1 | 1/2003 | Bardsley et al. |
| 2003/0025668 | A1 | 2/2003 | Lin |
| 2003/0163737 | A1 | 8/2003 | Roskind |
| 2003/0199289 | A1 | 10/2003 | Kao et al. |
| 2003/0204481 | A1 | 10/2003 | Lau |
| 2004/0060007 | A1 | 3/2004 | Gottlob et al. |
| 2004/0128296 | A1 | 7/2004 | Krishnamurthy et al. |
| 2004/0128552 | A1* | 7/2004 | Toomey .................. 713/201 |
| 2004/0143581 | A1 | 7/2004 | Bohannon et al. |
| 2004/0158714 | A1 | 8/2004 | Peyravian |
| 2004/0261018 | A1 | 12/2004 | Dunne et al. |
| 2005/0022020 | A1 | 1/2005 | Fremberg |
| 2005/0041009 | A1 | 2/2005 | Kuroda |
| 2005/0049017 | A1 | 3/2005 | Yoda |
| 2005/0068913 | A1 | 3/2005 | Tan et al. |
| 2005/0087769 | A1 | 4/2005 | Yamazaki et al. |
| 2005/0108567 | A1 | 5/2005 | D'Souza et al. |
| 2005/0127820 | A1 | 6/2005 | Yamazaki et al. |
| 2005/0177578 | A1 | 8/2005 | Chen |
| 2005/0179850 | A1 | 8/2005 | Du |
| 2005/0182778 | A1 | 8/2005 | Heuer et al. |
| 2005/0192990 | A1 | 9/2005 | Kharitidi et al. |
| 2005/0228999 | A1* | 10/2005 | Jerdonek et al. ............. 713/176 |
| 2005/0229097 | A1 | 10/2005 | Lander |
| 2005/0235358 | A1 | 10/2005 | Keohane et al. |
| 2005/0273629 | A1* | 12/2005 | Abrams et al. ................ 713/189 |
| 2006/0015938 | A1* | 1/2006 | Wlodarczyk .................. 726/22 |
| 2006/0021031 | A1* | 1/2006 | Leahy et al. ................... 726/22 |
| 2006/0041759 | A1* | 2/2006 | Kaliski et al. ................ 713/184 |
| 2006/0055608 | A1 | 3/2006 | Minemura |
| 2006/0069697 | A1* | 3/2006 | Shraim et al. ................ 707/102 |
| 2006/0070128 | A1* | 3/2006 | Heimerdinger et al. ........ 726/23 |
| 2006/0090073 | A1* | 4/2006 | Steinberg et al. ............ 713/170 |
| 2006/0095955 | A1* | 5/2006 | Vong ................................ 726/3 |
| 2006/0123464 | A1* | 6/2006 | Goodman et al. ................ 726/2 |
| 2006/0123478 | A1* | 6/2006 | Rehfuss et al. ................ 726/22 |
| 2006/0150249 | A1* | 7/2006 | Gassen et al. .................. 726/23 |
| 2006/0200856 | A1 | 9/2006 | Salowey et al. |
| 2006/0216469 | A1 | 9/2006 | Hashizume |
| 2006/0224511 | A1* | 10/2006 | Allemann ...................... 705/43 |
| 2006/0224677 | A1* | 10/2006 | Ishikawa et al. ............. 709/206 |
| 2006/0232495 | A1 | 10/2006 | Chang et al. |
| 2006/0250312 | A1 | 11/2006 | Kobayashi |
| 2006/0294187 | A1* | 12/2006 | Hakel et al. ................... 709/206 |
| 2007/0005984 | A1 | 1/2007 | Florencio et al. |
| 2007/0006305 | A1 | 1/2007 | Florencio et al. |
| 2007/0136806 | A1* | 6/2007 | Berman ........................ 726/22 |
| 2007/0162331 | A1* | 7/2007 | Sullivan ........................ 705/14 |
| 2007/0199054 | A1 | 8/2007 | Florencio et al. |
| 2008/0015002 | A1 | 1/2008 | Crisp |
| 2009/0235084 | A1* | 9/2009 | Ferraro et al. ................ 713/182 |

FOREIGN PATENT DOCUMENTS

| | | |
|---|---|---|
| JP | 2004295252 A | 10/2004 |
| JP | 2005135381 A | 5/2005 |
| WO | WO2005125084 A1 | 12/2005 |

OTHER PUBLICATIONS

Netcraft, "Netcraft Toolbar Help Pages FAQ," 2004, available at: http://toolbar.netcraft.com/help/faq/index.html.

Boneh, et al., "Defending Against Online Identity Theft and Phishing," presentation given at Proceedings: United States—Japan Critical Information Infrastructure Protection Workshop, Sep. 2004, available at: http://www2.gwu.edu/~usjpciip/BonehD.pdf.

Boneh, et al., "Web Password Hashing," 3 pages, last accessed Jun. 28, 2005, available at: http://crypto.stanford.edu/PwdHash/.

International Search Report dated Oct. 24, 2007 for PCT Application No. PCT/US2007/004044, 3 Pages.

OA Dated Dec. 26, 2008 for U.S. Appl. No. 11/172,466, 35 pages.

OA Dated Dec. 23, 2008 for U.S. Appl. No. 11/318,378, 25 pages.

OA Dated Dec. 3, 2008 for U.S. Appl. No. 11/317,767, 13 pages.

OA Dated Dec. 29, 2008 for U.S. Appl. No. 11/319,377, 19 pages.

OA Dated Oct. 15, 2008 for U.S. Appl. No. 11/318,209, 14 pages.

U.S. Appl. No. 11/172,466, filed Jun. 30, 2005, Florencio, et al.

U.S. Appl. No. 11/360,900, filed Feb. 23, 2006, Florencio, et al.

Adida, B. et al., "Fighting Phishing Attacks: A Lightweight Trust Architecture for Detecting Spoofed Emails," i Proceedings of DIMACS Workshop on Theft in E-Commerce: Content, Identity, and Service, Piscataway, New Jersey, Apr. 2005, 16 pages.

Adida, B. et al., "Separable Identity-based Ring Signatures: Theoretical Foundations for Fighting Phishing Attacks," in Proceedings of DIMACS Workshop on Theft in E-Commerce: Content, Identity, and Service, Piscataway, New Jersey, Feb. 28, 2005, 18 pages.

Chou, N. et al., "Client-Side Defense Against Web-Based Identity Theft," in Proceedings of 11th Annual Network and Distributed System Security Symposium (NDSS '04), San Diego, Feb. 2004, 16 pages.

Delany, M., "Domain-Based Email Authentication Using Public-Keys Advertised in the DNS (DomanKeys)," Internet Draft available at: http://www.ietf.org/internet-drafts/draft-delany-domainkeys-base-03.txt, Sep. 29, 2005, last checked Feb. 24, 2006, 40 pages.

Florencio, D. and Herley, C., "Stopping a Phishing Attack, Even When the Victims Ignore Warnings," Microsoft Research Technical Report, Oct. 2005. Available at: http://research.microsoft.com/research/pubs/view.aspx?type=Publication&id=1489, last accessed Feb. 24, 2005.

Gabber, E. et al., "How to Make Personalized Web Browsing Simple, Secure, and Anonymous," Financial Cryptography, 1997, pp. 17-32.

Halderman, J.A. et al., "A Convenient Method for Securely Managing Passwords," in Proceedings of the 14th International World Wide Web Conference (WWW 2005), Chiba, Japan, May 10-14, 2005, 9 pages.

Jakobsson, M. and Young, A., "Distributed Phishing Attacks," in Proceedings of DIMACS Workshop on Theft in E-Commerce: Content, Identity, and Service, Piscataway, New Jersey, Apr. 2005, 10 pages.

Kelsey, J. et al., "Secure Applications of Low-Entropy Keys," Lecture Notes in Computer Science, 1997, vol. 1396, p. 121-134.

Oechslin, P., "Making a Faster Cryptanalytical Time-Memory Trade-Off," in Proceedings of Advances in Cryptology—CRYPT 2003, 23rd Annual International Cryptology Conference, Santa Barbara, California, Aug. 17-21, 2003, 15 pages.

Ross, B. et al., "A Browser Plug-In Solution to the Unique Password Problem," in Proceedings of the 14th USENIX Security Symposium, Technical Report Stanford-SecLab-TR-2005-1, 2005, 15 pages.

Sahami, M. et al., "A Bayesian Approach to Filtering Junk Email," in AAAI '98 Workshop on Learning for Text Categorization, Jul. 1998, 8 pages.

http://www.passport.com, links directly to: https://accountservices.passport.net/ppnetworkhome.srf?vv=330&lc=1033, last accessed Feb. 28, 2006.

http://www.spoofstick.com, last accessed Feb. 28, 2006.

Anti-Phishing Working Group, at http://www.antiphishing.org, last accessed Feb. 28, 2006.

"Bloom Filter" http://www.nist.gov/dads/HTML/bloomFilter.html last viewed, Jan. 27, 2006, 1 page.

"Earthlink Toolbar Featuring ScamBlocker for Windows Users" http://www/earthlink.net/software/free/toolbar/, last accessed Mar. 7, 2006, 2 pages.

Ross, et al. "Stronger Password Authentication Using Browser Extensions" (2005) Proceedings of the 14th Usenix Security Symposium 15 pages.

Luc Segoufin, Typing and Querying XML Documents: Some Complexity Bounds ; http://delivery.acm.org/10.1145/780000/773170/p167-segoufin.pdf?key1=773170&key2=7019847311&coll=GUIDE&dl=GUIDE&CFID=65860176&CFTOKEN=65663645.

Mustafa H. Qureshi, et al., Determining the Complexity of XML Documents ; http://doi.ieeecomputersociety.org/10.1109/ITCC.2005.126.

Ralf Lammel, et al., Analysis of XML schema usage, http://homepages.cwi.nl/~ralf/xml05/html/paper.htm.

(56) References Cited

OTHER PUBLICATIONS

Thomas J. McCabe, A complexity measure ; http://portal.acm.org/citation.cfm?id=807712&coll=GUIDE&dl=GUIDE&CFID=62736624&CFTOKEN=661444&ret=1#Fulltext.

James F. Power, et al., A metrics suite for grammar-based software, Journal of Software Maintenance and Evolution: Research and Practice, 2004. http://www.cs.nuim.ie/~jpower/Research/Papers/2004/jsme04.pdf.

Extended European search report for EP07770592 dated Sep. 14, 2009, EPO, 7 pages.

Translated Japanese Office Action mailed Oct. 12, 2012 for Japanese patent application No. 2008-556358, a counterpart foreign application of U.S. Appl. No. 11/360,254, 10 pages.

Translated Japanese Office Action mailed May 10, 2013 for Japanese patent application No. 2008-556358, a counterpart foreign application of U.S. Appl. No. 11/360,254, 3 pages.

* cited by examiner

CLIENT SIDE ATTACK RESISTANT PHISHING DETECTION

CROSS REFERENCE TO RELATED APPLICATION(S)

This application is related to co-pending U.S. patent application Ser. No. 11/172,466, filed Jun. 30, 2005, and entitled, "PREVENTING PHISHING ATTACKS".

BACKGROUND

As the Internet grows in popularity as a business medium, users engage in a wider variety of transactions online. Some of these transactions, such as transactions with financial institutions or online retailers, can involve sensitive personal information such as bank account numbers or credit card information, as well as access to money or other valuable resources. To control access to such information and resources, a variety of methods can be employed. For example, many online institutions require users to register with the institution and obtain a unique user name and password prior to transacting any business online.

One consequence of this system is that a username and password can only help protect the personal information of a user so long as the username and password remain under the control of the user. A third party who obtains the username and password of another can use that username and password to perform any transaction that the owner could perform. This consequence has spawned a practice commonly referred to as phishing.

Phishing can generally be described as an attempt by a third party to deceive a user into disclosing his username and password to that third party through the third party's impersonation of an entity that is known and trusted by the user. Generally, a phishing attack can be initiated by sending an electronic mail message to a user that is crafted to appear to originate from a known and trusted entity. Such electronic mail messages commonly inform the recipient that the entity must verify the information of the user by having the user enter his username and password. The user may enter this information at a web site that appears to belong to the known and trusted entity but is actually controlled by a third party. Once the user enters this information at the web site of the third party, sometimes called a phishing site, the third party can use the entered username and password at the real website of the entity that the third party is impersonating to perform transactions or even to wrest control of an account with the known and trusted party away from the user.

Several factors make phishing a challenging problem from a computer security standpoint. First, in phishing attacks the victim unknowingly or unwittingly assists the attacker by voluntarily providing his security credentials such as a username and password to the attacker. Second, identifying phishing sites can be difficult using a fixed algorithm because attackers both quickly adapt to security measures and it is difficult if not impossible to anticipate the ingenuity of all future attackers with a fixed set of rules. Third, users tend to ignore warnings about security dangers. Even the best warnings can be rendered useless by a user who does not heed the warning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A phishing detection client component and method is provided. The component can be employed as part of a system to detect and, optionally, prevent phishing attacks. The phishing detection client component can provide password reuse event report(s), for example, to a phishing detection server component.

The client component can further include a credential component that can track use of credentials by a user and determine whether a specific security credential is being used or presented. Due to the malicious nature of phishing in general, the client component can be susceptible to attacks by phishers. For example, phishers can generate false logins in an attempt to flood the client component with information resulting in induced false positives and/or induced false negatives.

In one example, the client component can confirm that the purported password was actually entered (e.g., typed) by the user. This can avoid an attack where a phisher attempts to include a number of spurious entries in a protected credential store in order to "flush" the actual protected content. To avoid this, before including something in the protected credential store, the credential component confirms that the password was actually typed. Knowing the length of the password, the credential component can search a buffer to make sure that password was actually typed. For example, the check can be done when a POST event occurs.

Optionally, a Bloom filter or other hashing technique can further be employed to reduce the length of the buffer. The Bloom filter is a probabilistic algorithm to quickly test membership in a large set using multiple hashing functions into a single array of bits. The Bloom filter works effectively when space is an issue and a small error is tolerated. Additionally, a hash produced by the Bloom filter is irreversible thus mitigating security concerns. Optionally, in order to reduce search time and mitigate security concerns, the protected passwords stored in the protected credential store can be hashed with a Bloom filter.

Additionally, a phisher can generate a post with a number of random user IDs (e.g., large quantity), and a single password. The post could be used to flush the protected credential store. In another example, the client component can limit the quantity of user IDs per password in an effort to mitigate the effects of phisher's attempts to flush the protected credential store.

In yet another example, in an effort to avoid detection, phishers can redirect a user to another page either before completion of the password typing, or to a new, different page for each user. Since each user would be sent to a different page (presumably unique to the user), the phishing detection server component would not ordinarily detect the phishing attempt. However, the protection component can, optionally, provide a report to the phishing detection server component for each automatic redirect in a given period of time (e.g., N seconds). The phishing detection server component can track this behavior across a plurality of client components and determine the nature of the phishing attack. Accordingly, by reporting the automatic redirect, the potential for this attack is reduced.

Further, the password reuse event report sent from the client component to the phishing detection server component can include a copy of the page and/or code (e.g., HTML) associated with the report. However, due, for example, to privacy concerns associated with sending a copy of a page and/or the HTML code to the phishing detection server component, in another example, the client component can send a hashed version of the page and/or the code. The phishing detection server component can then obtain its own version directly (e.g., using the URL), and compare the two hashes. Optionally, the hash can be region-based to identify region(s) of the pages that were altered.

In one example, once a URL and/or domain is identified as a non-trusted site, user(s) are not permitted to provide any protected credential at that site. Prohibiting entry of a protected credential (e.g., password) can be frustrating for user(s). Thus, in another example, instead of prohibiting the entry of all protected credential at the non-trusted site, the phishing detection server component identifies the protected credential which is the suspected target of the non-trusted site and the user is prohibited from entering only that protected credential at the non-trusted site.

As discussed above, in one example, the buffer can be accessed and hashes of several possible string lengths of a password can be computed. In another example, the credential component can compute hashes of the potential password and/or user ID in a forward fashion which avoids the need for buffering of keystrokes.

Next, in order to mitigate concerns regarding storing of information regarding password(s), phishing detection can be centered upon a user ID. In this example, hashes of the user ID are computed and stored in the protected credential store.

As the user types, hashes of the information typed are computed and compared to entry(ies) in the protected credential store. When a hit is found, the client component reports the event to the phishing detection server component (e.g., a centralized server). The phishing detection server component can aggregate that information, and combines with other information available to reach a decision about the trustworthiness of the suspected site.

User IDs can be susceptible to phishing attacks. For example, in an attempt to mask its phishing efforts, a phishing site can confuse the user and induce the user to use the backspace key and/or reenter information. At a phishing site, a user can be prompted to enter a user ID. In providing feedback to the user (e.g., in the entry field), the phishing site can add character(s) not entered by the user causing the user to use the backspace key. Additionally, in providing feedback to the user, the phishing site can intentionally omit character(s) causing the user to reenter the character(s). In both scenarios, examination of the buffer does not match the actual password, and yet the phisher will receive either the password or enough information to determine it.

Accordingly, in one example, instead of computing hashes of the last N characters, the credential component can branch the hashing of the user ID (and/or password) to include possible inserted and/or deleted character(s). For example, when a backspace is pressed, an extra search branch can be created that assumes that backspace is spurious. Additionally and/or alternatively, when a repeat character is typed, the credential component can similarly create a branch. Optionally, the credential component can employ a variant that combines (and removes) repeated character(s) both on the original password (e.g., before inserting in the protected credential store) and in the keyboard monitoring.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

Figure 1:
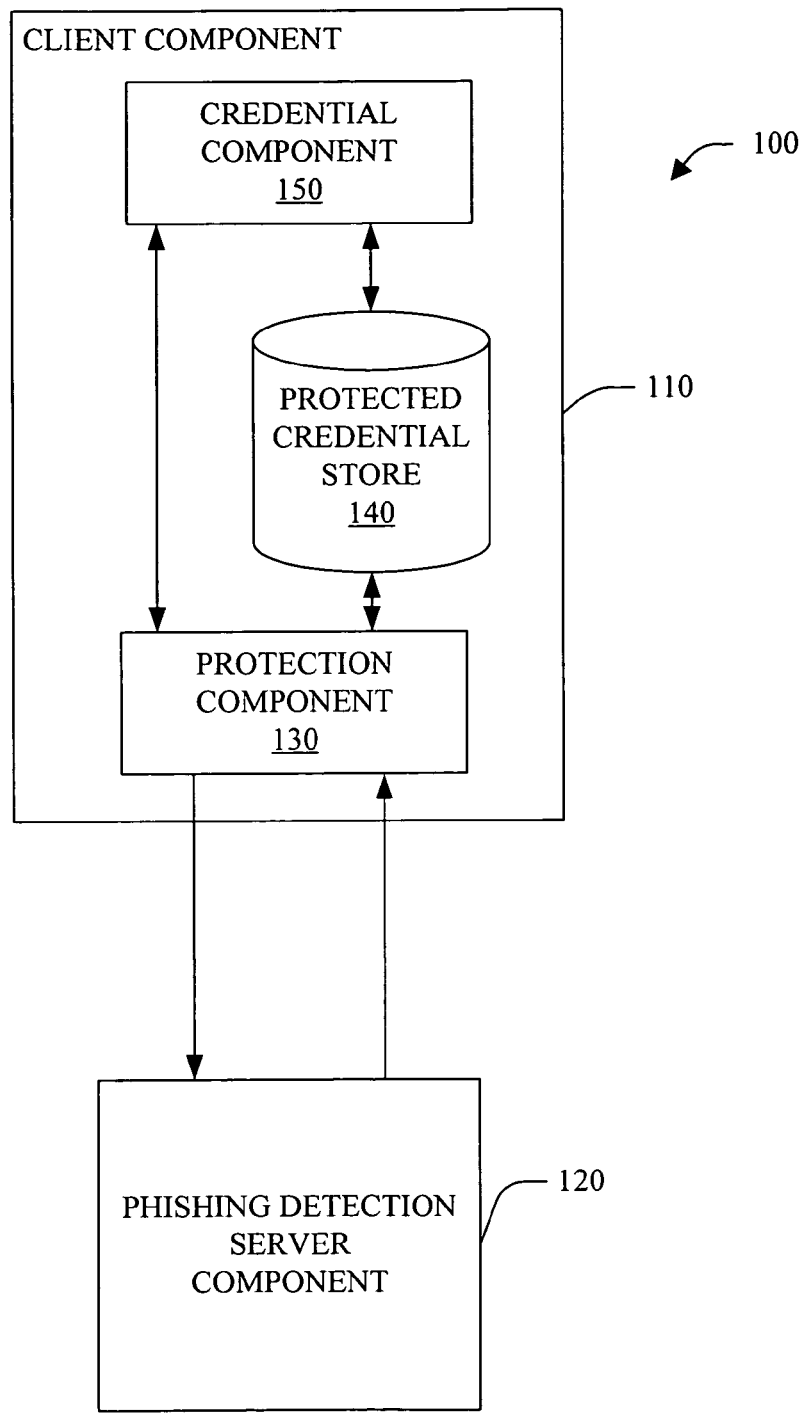
FIG. 1 is a block diagram of a phishing detection system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Detection/Prevention of Phishing Attacks

Referring to FIG. 1, a phishing detection system 100 is illustrated. The system 100 can be employed to detect and, optionally, prevent phishing attacks. Thus, the system 100 can be used to prevent unauthorized acquisition of security credentials, such as username and password combinations, by unauthorized third parties. Additionally or alternatively, the phishing prevention system 100 can be used to warn a user that he is the target of a phishing attack and reinforce good computing security practices.

The system 100 can include a phishing detection client component 110 and a phishing detection server component 120. For example, the client component 110 can be implemented as an add-on component, such as a plugin, for a web browser. The client component 110 can also be implemented to work with an electronic mail reader or client, especially an electronic mail reader or client that supports the use of hypertext markup language (HTML) in messages.

Due at least in part to the nature of phishing attacks, the client component 110 can be of great value in determining whether a user is a target of a phishing attack. For example, in one implementation, the client component 110 can be part of a web browser. The use of a web browser can facilitate a phishing attack because it provides a platform upon which an attacker can reproduce the format, layout and content, including graphical content, of a trusted website. However, other capabilities of the web browser can be used to defeat an attempted attack. For example, the web browser can provide additional information about a source of the information displayed, such as a uniform resource locator (URL), an Internet protocol (IP) address, and a relatively standard format for obtaining and presenting user input. Such information can be used to verify content sources and protect personal information, specifically including security credentials.

The client component 110 includes a protection component 130, a protected credential store 140 and a credential component 150. The credential component 150 identifies and stores credential(s) in the protected credential store 140.

The protected credential store 140 can be any suitable or appropriate data store, such as a text file, a database, a linked list, or a data structure. In one example, the protected credential store 140 is a text file that includes a pre-selected maximum number of entries, for example, two hundred fifty six (256). This pre-selected maximum value is arbitrary and is merely selected to control storage space. Another value, or no value at all, can also be chosen.

In this example, entries in the protected credential store 140 can be stored in the following format:

$$P_0 = \{dom, H_1, H_2\}$$

where dom is the domain name of the computing system from which an HTML form or other request for security credentials originated, $H_1$ is a hash of the password, and $H_2$ is a hash of the username. To control entries in the list, an appropriate entry replacement algorithm can be employed. One such algorithm is the least recently used (LRU) algorithm. A new entry replaces an entry deemed to be the one that has least recently been used.

The credential component 150 can further identify password reuse event(s) (PREs) in which a protected credential (e.g., password) is attempted to be used at a different site. The PRE is reported to the phishing detection server component 120 which can aggregate information from one or more client components 110 to determine whether a phishing attack is in progress. If it is determined that a phishing attack is in progress, the phishing detection server component 120 can provide information back to the client component 110, for example, warning the issue of the phishing attack and/or prevent entry of the credential by the user.

Figure 2:
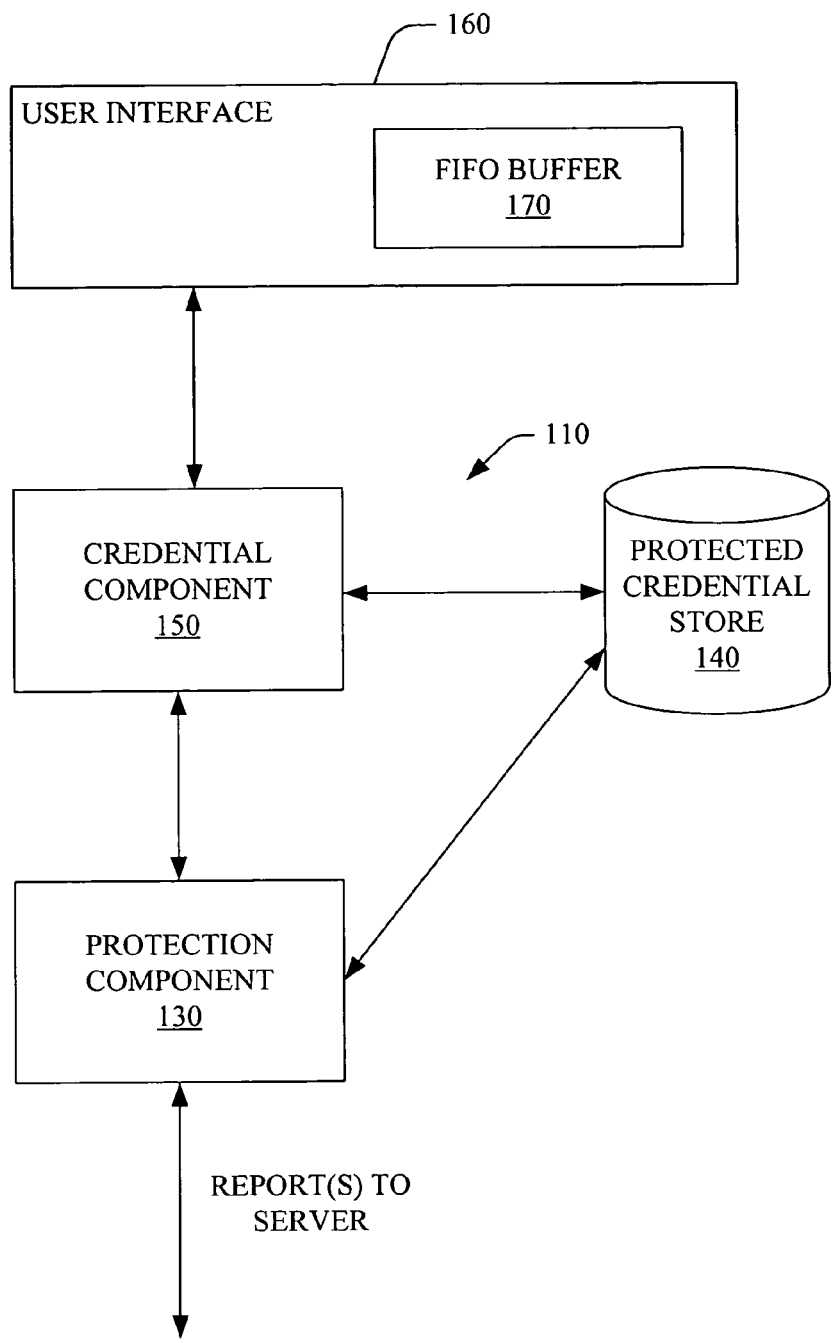
FIG. 2 is a block diagram of a phishing detection client component.

Turning briefly to FIG. 2, the credential component 150 can track use of credentials by a user and determine whether a specific security credential is being used or presented to a computing system. A variety of methods can be used to identify and obtain security credentials. Details of such methods are largely implementation-dependent.

In an implementation that operates with HTML pages, such as a web browser-based implementation, the use of relatively standard HTML forms makes identification of credentials on a non-malignant page relatively easy. A non-malignant page includes a page that makes no attempt to obscure or conceal the fact that it is gathering password or similar data. HTML forms support the use of data input fields for usernames and passwords that are passed from a web browser to a web server through invocation of the HTTP POST command. Information placed by a user in the username and password fields of an HTML form can be captured or otherwise obtained by a component like a browser plug-in before that information is sent over a network link to a computing system.

An additional or alternate implementation focuses not solely on data entry in well-defined and properly named fields but on keystrokes. For each key typed, the character corresponding to the typed key is placed in a data buffer such as a first-in, first-out (FIFO) buffer 170 of a user interface 160. The size of the FIFO buffer 170, and correspondingly the size of any security credential to be checked, can be arbitrarily limited to a certain number of characters, such as a length of the longest password that is expected to be encountered, for example, sixteen (16). A minimum value can also be implemented by padding too-short entries with other data. Similarly, longer passwords can be truncated for the purposes of identification described herein.

Upon accessing each keystroke, the credential component 150 can perform an encryption or other security-related operation, such as computing a hash function, on the data in the FIFO buffer 170. The credential component 150 can compare the value of the hash function to entries in a protected credential store 140 to determine whether a user has entered security credentials using the keyboard. The keyboard mentioned here is simply a preferred data entry tool. A person of ordinary skill in the art will realize from reading this disclosure that other data entry methods can be used.

When replacing an entry, all entries are shifted as follows:

$$P_{k+1} = P_k \text{ for } k=0, \ldots, 254$$

is calculated before adding a new entry $P_0$ as described above. Entries in the protected credential data store 140 can initially be populated by a user entering known credential information for trusted sites as a batch or can be accumulated over time as a user navigates to a trusted site.

In operation, the client component 110 can function as follows: A user can access a computing system through the user interface 160. As the user types characters at a keyboard connected with the user interface 160, each character is stored in the FIFO buffer 170. The credential component 150 accesses the string of characters stored in the FIFO buffer 170 and computes one or more hash functions on that string. The credential component 150 accesses protected credentials stored in the protected credential store 140. The computed hash function values are compared to entries in the list of protected credentials.

Credential Verification

Due to the malicious nature of phishing in general, the client component 110 can be susceptible to attacks by phishers. For example, phishers can generate false logins in an attempt to flood the client component 110 with information resulting in induced false positives and/or induced false negatives. Several mechanisms for mitigating the effects of phishers on the client component 110 are discussed below.

Confirm That Password Was Actually Typed.

The client component 110 can confirm that the purported password was actually entered (e.g., typed) by the user. This can prevent an attack where a phisher attempts to include a number of spurious entries in the protected credential store 140 in order to "flush" the actual protected content. To avoid this, before including something in the protected credential store 140, the credential component 150 confirms that the password was actually typed. The credential component 150 can proceed as discussed above; however, knowing the length of the password, the credential component can search the FIFO buffer 170 to make sure that password was actually typed. For example, the check can be done when the POST event occurs.

Optionally, a Bloom filter or other hashing technique can further be employed to reduce the length of the buffer 170. The Bloom filter is a probabilistic algorithm to quickly test membership in a large set using multiple hashing functions into a single array of bits. The Bloom filter works effectively when space is an issue and a small error probability is tolerated. Additionally, a hash produced by the Bloom filter is irreversible, thus mitigating security concerns. Optionally, in order to reduce search time and mitigate security concerns, the protected passwords stored in the protected credential store 140 can be hashed with a Bloom filter.

Limit the Quantity of User IDs Per Password

Since user IDs are not clearly identified, a phisher can generate a post with a number of random user IDs (e.g., large quantity), and a single password. The post could be used to flush the protected credential store 140.

Optionally, the client component 110 can limit the quantity of user IDs per password to in an effort to mitigate the effects of phishers attempts to flush the protected credential store 140. In one example, the number of user IDs is limited to five for each password.

Report Automatic Redirect Attempts

In an effort to avoid detection, phishers can redirect a user to another page either before completion of the password typing, or to a new, different page for each user. Since each user would be sent to a different page (presumably unique to the user), the phishing detection server component 120 would not ordinarily detect the phishing attempt.

However, in one example, the protection component 130 provides a report to the phishing detection server component 120 for each automatic redirect in a given period of time (e.g., N seconds). The phishing detection server component 120 can track this behavior across a plurality of client components 110 and determine the nature of the phishing attack. Accordingly, by reporting the automatic redirect, the potential for this attack is reduced.

Include Hash of Page

In one example, the password reuse event report sent from the client component 110 to the phishing detection server component 120 can include a copy of the page and/or code (e.g., HTML) associated with the report. However, due, for example, to privacy concerns associated with sending a copy of a page and/or the HTML code to the phishing detection server component 120, in another example, the client component 110 can send a hashed version of the page and/or the code. The phishing detection server component 120 can then obtain its own version directly (e.g., using the URL), and compares the two hashes. Optionally, the hash can be region-based to identify region(s) of the pages that were altered.

Limited Prohibition on Password entry

In this example, once a URL and/or domain is identified as a non-trusted site, user(s) are not permitted to provide any protected credential at that site. In another example, instead of prohibiting the entry of all protected credential at the non-trusted site, the phishing detection server component 120 identifies the protected credential which is the suspected target of the non-trusted site and the user is prohibited from entering only that protected credential at the non-trusted site.

Forward Hashing of Keystrokes

As discussed above, in one example, the FIFO buffer 170 is accessed and hashes of several possible string lengths of a password are computed. In another example, the credential component 150 can compute hashes of the potential password and/or user ID in a forward fashion which avoids the need for buffering of keystrokes.

In computing hashes of a sequence of substrings without keystroke buffering, the basic idea is to compute the hash in a way similar to the one described above before, but in reverse order. For example, when populating the protected credential store 140, a hash of the entry to be protected can be computed in the following way:

//Typical parameters:
$N_{min}$=the minimum length of the string to be protected (e.g., 6)
$N_{max}$=the maximum length of the string to be protected (e.g., 16)
M=number of secure hash algorithm (SHA)-1 operations that can be computed in a given period of time (e.g., 10 ms).
D(N)=N character string to be used in computing the hash To compute the hash, the first character of D(N) is obtained, any computer specific salt is added and the SHA-1 is employed to compute hash. Thereafter, one at a time, each of the first Nmin characters are added and the SHA-1 is computed after each character. When Nmin character has been added, the SHA-1 is computed M times.

The next character is added to the result and the SHA-1 is computed M/2 times. This is repeated until all N characters are incorporated. Thereafter, any entry-specific salt (if any) is added, and the SHA-1 computed one final time which is stored in the protected credential store 140.

Next, during the investigation stage, the credential component 150 can initialize the hash to Nmax hashes with random information and 0 to nMax-1 keystrokes. The credential component 150 can perform the following (e.g., at every typed keystroke):

At each Key Pressed:

```
For h = NS:-1:1
    Hash(h) = Append the just-typed key to Hash(h), and compute
    SHA-1 once;
    If (h > Nmin)
        Hash(h) = Compute SHA-1 of Hash(h) (M^(-2h) -1) times
        Compute hash with each entry specific salt, and check
        against table; Report if hit
    End
    If (h < Nmax)
        Hash(h+1) = Hash(h);
    End
End
```

Note that the above mechanism does not store any information other then the Nmax partial hashes. Furthermore, after Nmax characters are typed, the hash is discarded. That is, there is no buffer of keystrokes at all. The credential component 150 can compare the hashes with the hashed protected credentials stored in the protected credential store 140.

Use of User ID

In one example, phishing detection is centered upon the user ID in order to mitigate concerns regarding storing of information regarding password(s). In this example, hashes of the user ID are computed and stored in the protected credential store 140.

As the user types, hashes of the information typed are computed and compared to entry(ies) in the protected credential store 140. When a hit is found, the client component 110 reports the event to the phishing detection server component 120 (e.g., a centralized server). The phishing detection server component 120 can aggregate that information, and combines with other information available to reach a decision about the trustworthiness of the suspected site.

User IDs can be susceptible to phishing attacks. For example, in an attempt to mask its phishing efforts, a phishing site can induce a user to use the backspace key and/or reenter information. At a phishing site, a user can be prompted to enter a user ID. In providing feedback to the user (e.g., in the entry field), the phishing site can add character(s) not entered by the user causing the user to use the backspace key. Additionally, in providing feedback to the user, the phishing site can intentionally omit character(s) causing the user to reenter the character(s). In both scenarios, examination of the FIFO buffer 160 does not match the information which the phishing site has actually received.

Accordingly, in one example, instead of computing hashes of the last N characters, the credential component 150 can branch the hashing of the user ID (and/or password) to include possible repeated and/or deleted character(s). For example, when a backspace is pressed, an extra search branch can be created that assumes that backspace is spurious. Additionally and/or alternatively, when a repeat character is typed, the credential component can similarly create a branch. Optionally, the credential component 150 can employ a variant that combines (and removes) repeated character(s) both on the original password (e.g., before inserting in the protected credential store 140) and in the keyboard monitoring.

Checking of User ID in Addition to Password

Since generally, passwords are not echoed to a user, that is, the keystrokes are not displayed to the user, it is generally more difficult for phishers to induce such confusion attacks on passwords. However, in one example, the credential component 150 can perform a hash of suspected user IDs which it can employ to search the protected credential store 140. In this example, reports of suspected user ID based phishing can be provided to the phishing detection server component 120. One advantage of such combined use is that an early warning (e.g., before the password is typed) can be given if a improper UserID re-use is detected.

Storing Protected Credentials on the Phishing Detection Server Component

Figure 3:
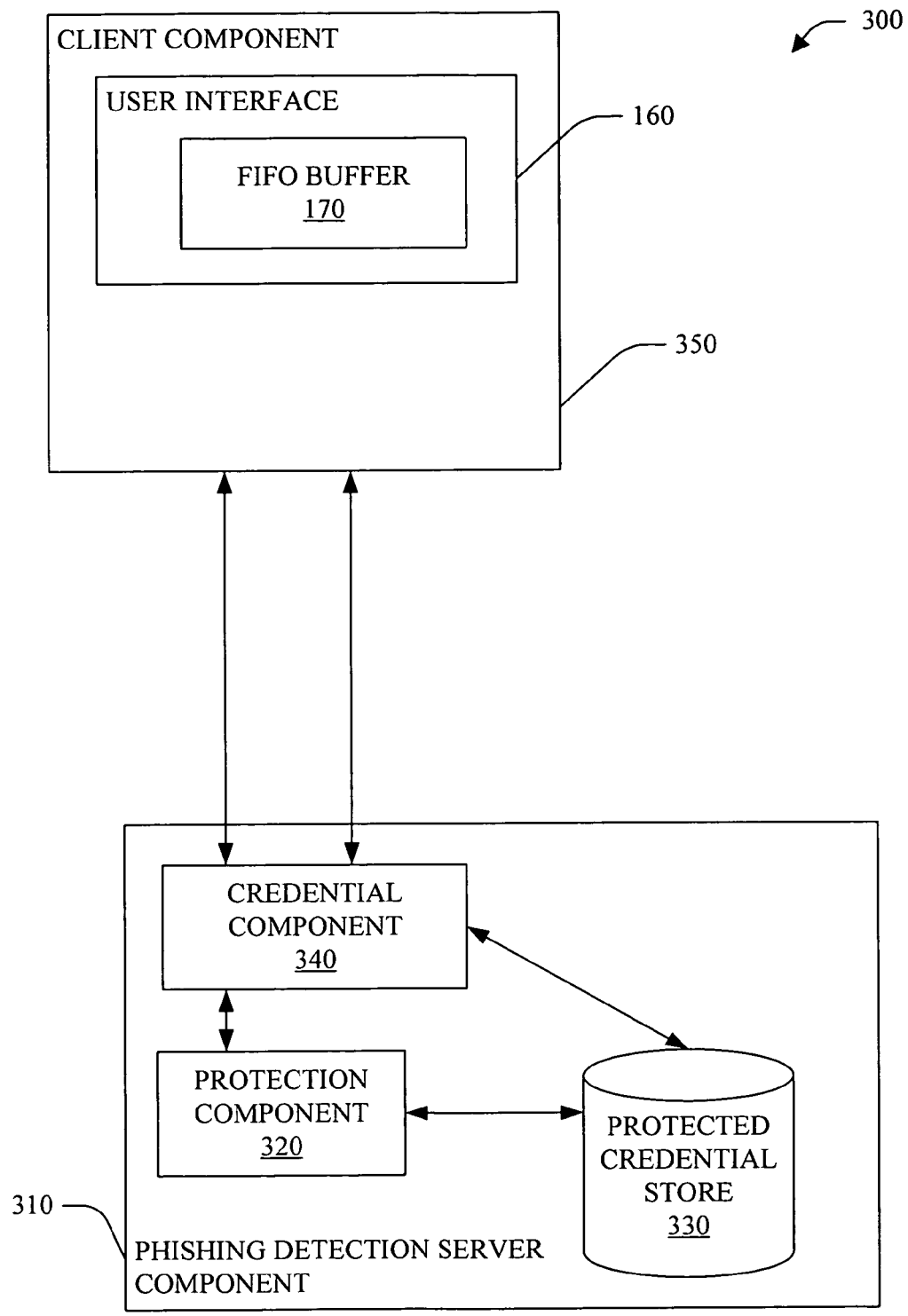
FIG. 3 is a block diagram of a phishing detection system.

Turning to FIG. 3, a phishing detection system 300 is illustrated. The system 300 can be employed to facilitate roaming phishing detection. The system 300 includes a phishing detection server component 310 that includes a protection component 320 and a protected credential store 330 that stores protected credential(s) for one or more users of the system 300.

The protection component 320 receives information from a credential component 340 from a client component 350. Based on the information received and information stored in the protected credential store 330, the credential component 340 can determine whether a phishing attack is underway (and/or has occurred) as discussed above.

By storing the protected credential(s) at the server component 310, privacy and/or security concerns associated with local storing of protected credential(s) can be alleviated. Further, user(s) of the system 300 can "roam" to other computer(s) (e.g., Internet café, friend's computer etc.) and still have the benefit of phishing detection for the user's credentials. For example, a user can login (e.g., securely) to the protection component 320 and then have phishing detection performed on information entered by the user.

It is to be appreciated that the system 100, the client component 110, the phishing detection server component 120, the protection component 130, the protected credential store 140, the credential component 150, the FIFO buffer 170, the user interface 160, the system 300, the phishing detection server component 310, the protection component 320, the protected credential store 330, the credential component 340 and/or the client component 350 can be computer components as that term is defined herein.

Figure 4:
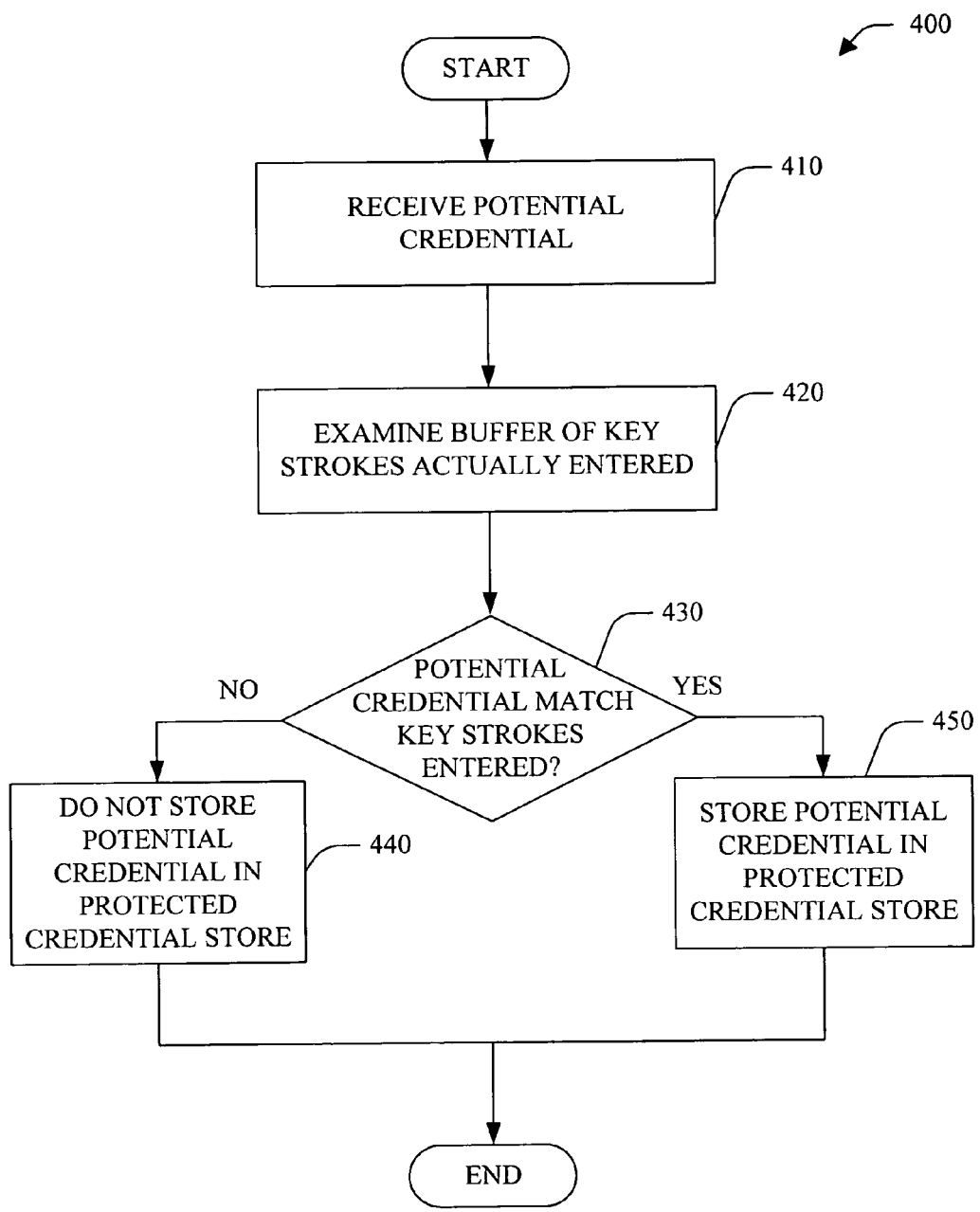
FIG. 4 is a flow chart of a method of detecting a phishing attack.
Figure 5:
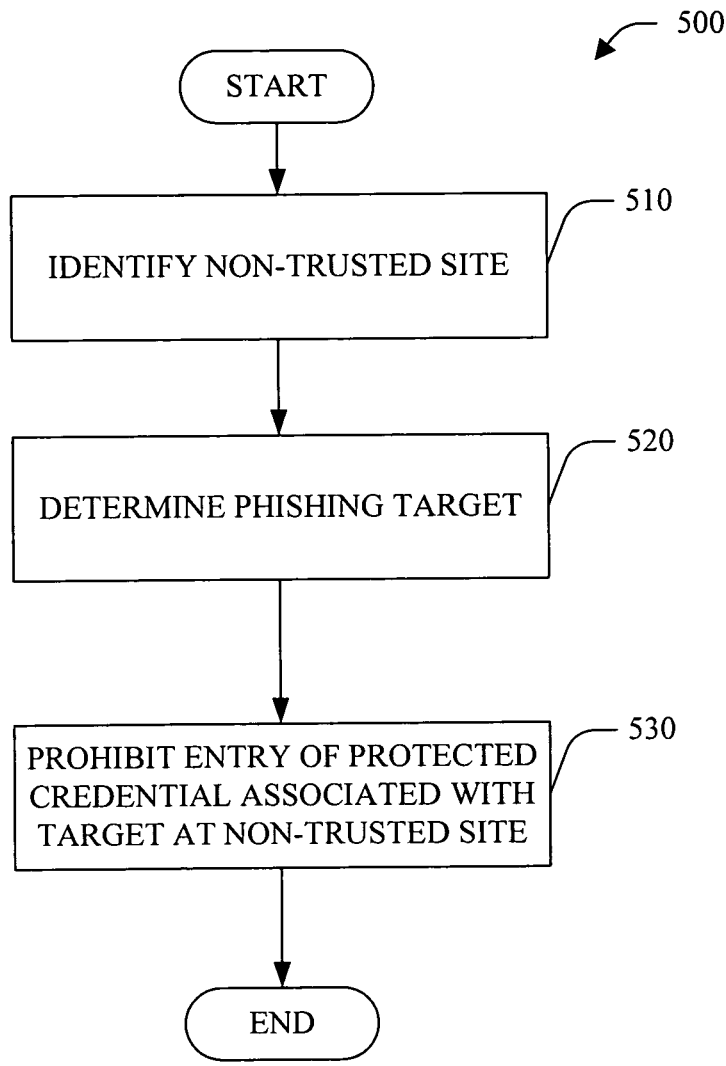
FIG. 5 is a flow chart of a method of detecting a phishing attack.
Figure 6:
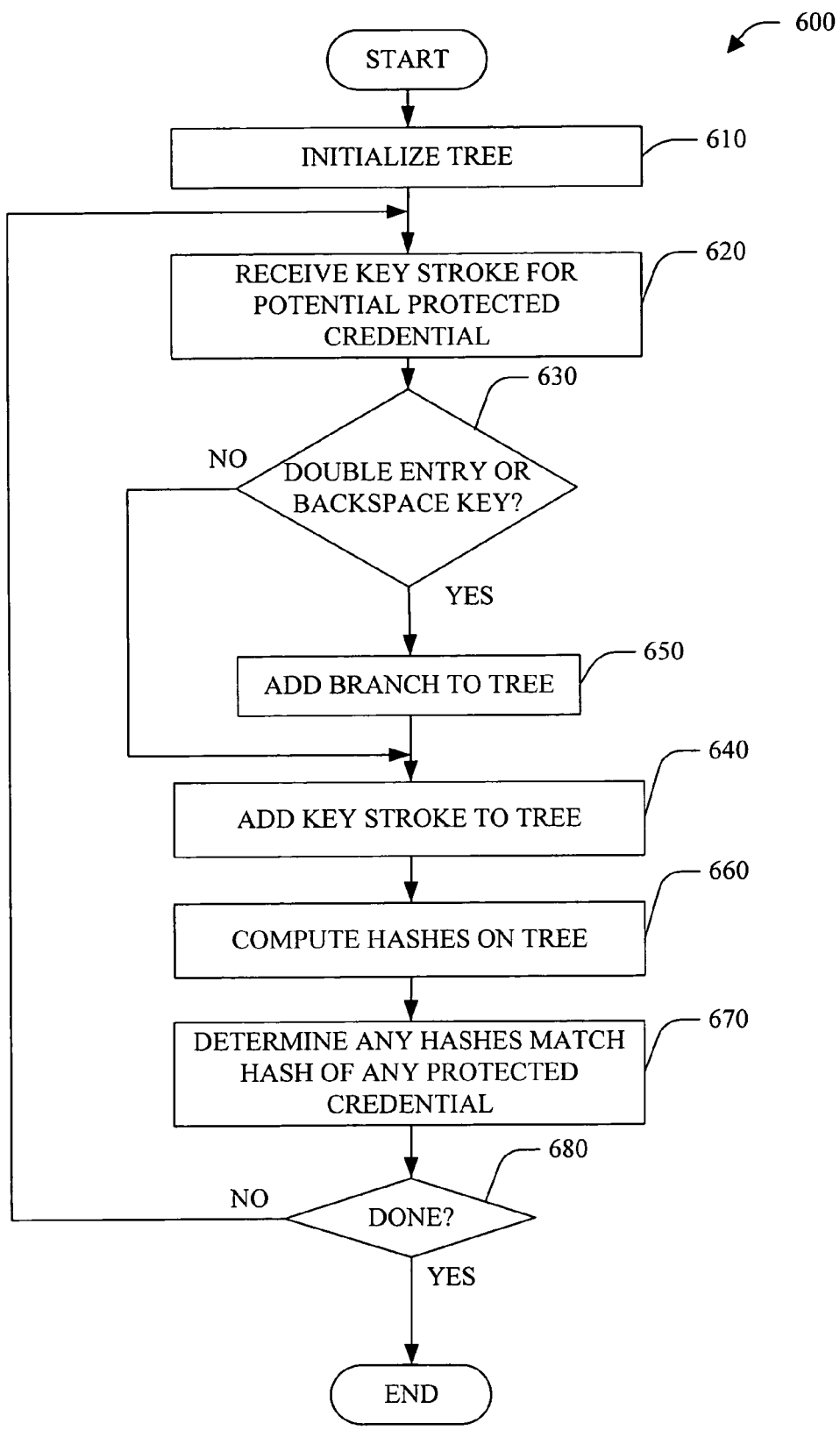
FIG. 6 is a flow chart of a method of detecting a phishing attack.

Turning briefly to FIGS. 4-6, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 4, a method of detecting a phishing attack 400 is illustrated. At 410, a potential credential is received. At 420, a buffer of key strokes actually entered (e.g., by a user) is examined. At 430, a determination is made at as to whether the potential credential matches the key strokes entered.

If the determination at 430 is NO, at 440, the potential credential is not stored in the protected credential store, and, no further processing occurs. If the determination at 430 is YES, at 450, the potential credential is stored in the protected credential store, and, no further processing occurs.

Turning to FIG. 5, a method of detecting a phishing attack 500 is illustrated. At 510, a non-trusted site is identified. At 520, a phishing target is determined. At 530, entry of a protected credential associated with the target is prohibited at the non-trusted site.

Next, referring to FIG. 6, a method of detecting a phishing attack 600 is illustrated. At 610, a tree is initialized. At 620, a key stroke for a potential protected credential is received.

At 630, a determination is made as to whether the key stroke is a double entry or a backspace key. If the determination at 630 is NO, processing continues at 640. If the determination at 630 is YES, at 640, a branch is added to the tree and processing continues at 640.

At 640, the key stroke is added to the tree, and any branches that exceed the maximum password length are eliminated from the tree. At 660, hashes are computed on the tree. At 670, it is determined whether any hashes in the tree match a hash of a protected credential. At 680, a determination is made as to whether the system is done (e.g., hash of tree matches hash of a protected credential and/or last key stroke of entry reached). If the determination at 680 is NO, processing continues at 620. If the determination at 680 is YES, no further processing occurs.

Figure 7:
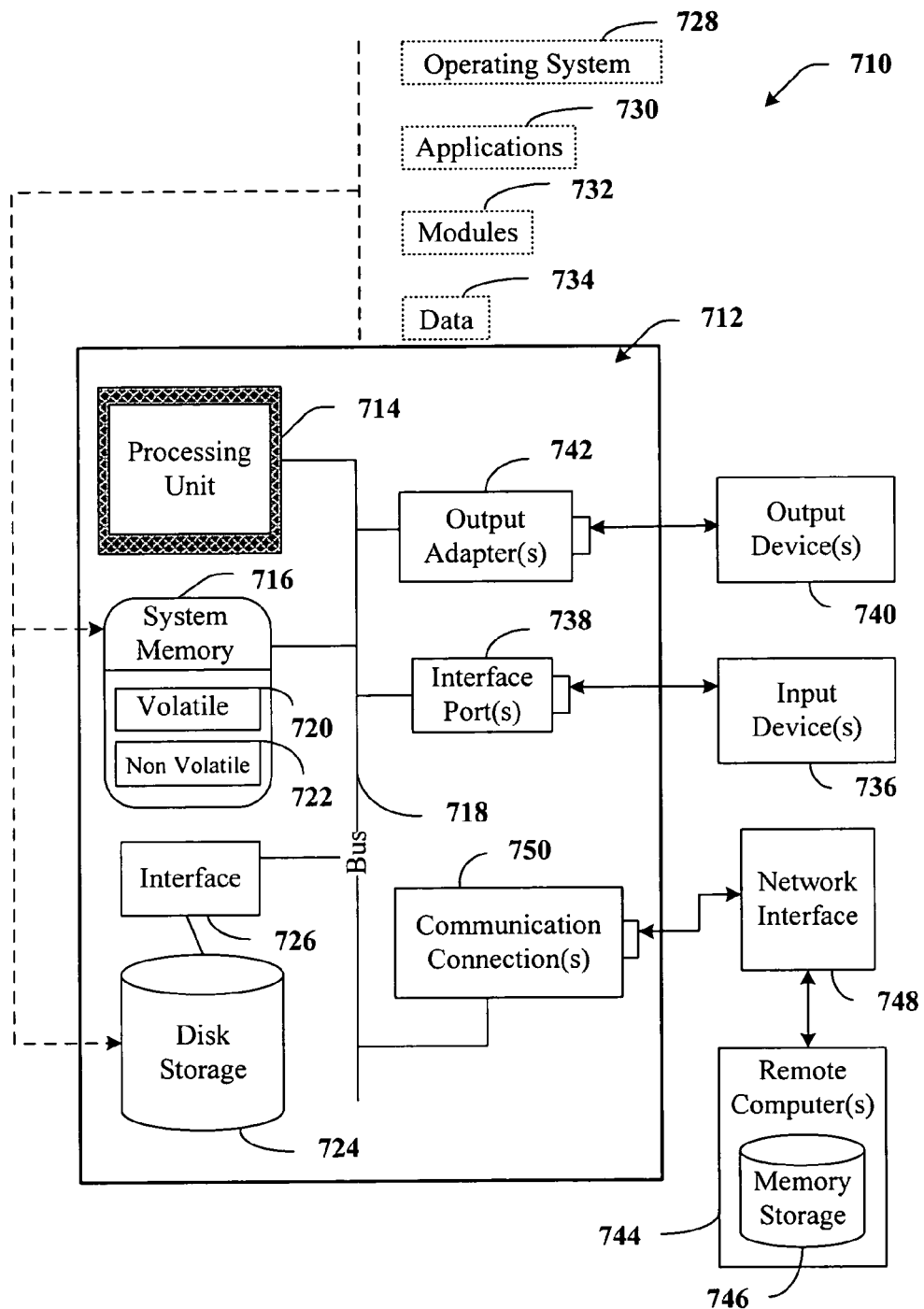
FIG. 7 illustrates an example operating environment.

In order to provide additional context for various aspects of the claimed subject matter, FIG. 7 and the following discussion are intended to provide a brief, general description of a suitable operating environment 710. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the claimed subject matter can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

Figure 8:
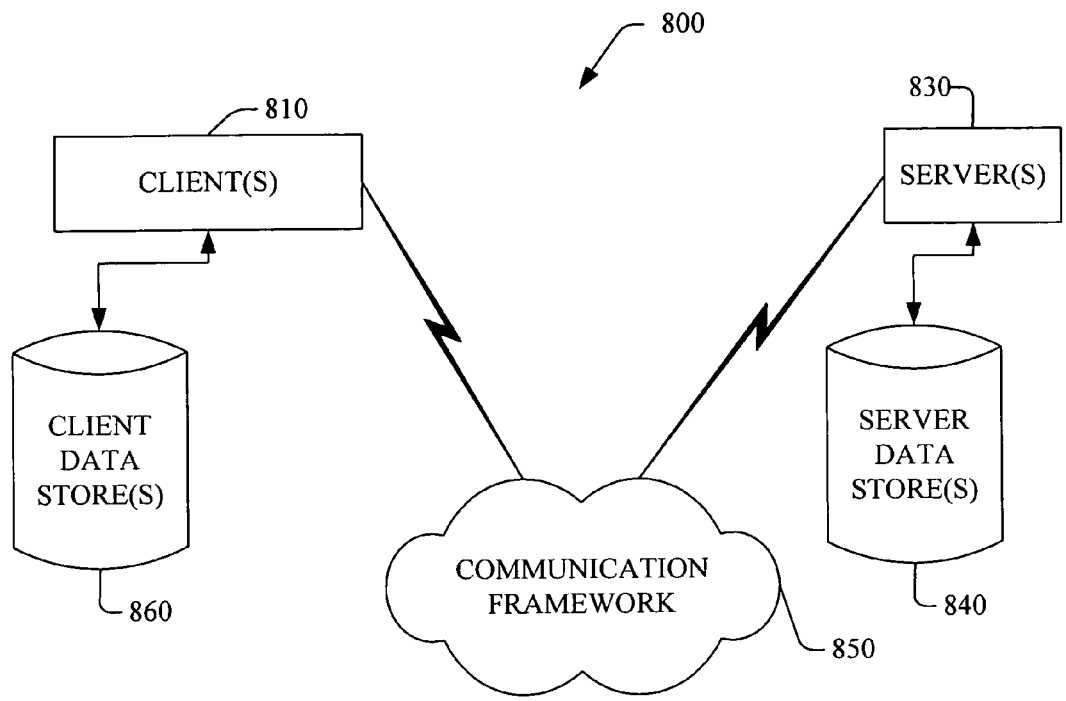
FIG. 8 illustrates an exemplary networking environment.

FIG. 8 is a schematic block diagram of a sample-computing environment 800 with which the claimed subject matter can interact. The system 800 includes one or more client(s) 810. The client(s) 810 can be hardware and/or software (e.g., threads, processes, computing devices). The system 800 also includes one or more server(s) 820. The server(s) 820 can be hardware and/or software (e.g., threads, processes, computing devices). The servers 820 can house threads to perform transformations by employing the subject innovation, for example.

One possible communication between a client 810 and a server 820 can be in the form of a data packet adapted to be transmitted between two or more computer processes. The system 800 includes a communication framework 840 that can be employed to facilitate communications between the client(s) 810 and the server(s) 820. The client(s) 810 are operably connected to one or more client data store(s) 850 that can be employed to store information local to the client(s) 810. Similarly, the server(s) 820 are operably connected to one or more server data store(s) 830 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a processor;
   a memory;
   a credential component stored in the memory and configured to be executed by the processor, the credential component configured to:
      identify entry of a credential and store information associated with the credential in a protected credential store, the information including at least a domain name of a trusted site and at least one user ID, the credential component having a maximum threshold quantity of user IDs with a particular password;
      performing a branch on a hash of data input by a user to include yet-to-be inserted characters, deleted characters or both; and
      compare the hash of the data input by the user to a hash of the information stored in the protected credential store to determine input of the credential and the domain name associated with the credential; and
   a protection component stored in the memory and configured to be executed by the processor, the protection component configured to:
      detect automatic redirects before completion of the data input by the user based at least in part by the comparing by the credential component, the automatic redirects being an operation employed by a phisher to automatically redirect a user to a site different than the domain name associated with the credential; and
      provide a report of an attempted submission of the credential at the site when the site is different than the domain name associated with the credential.

2. The system of claim 1, wherein the credential component compares a computed hash of the data input with a hash of the credential to determine whether the data input corresponds to the credential.

3. The system of claim 1, wherein the credential component accesses a buffer of key strokes of the data input to confirm that the credential was entered by the user.

4. The system of claim 3, wherein the credential component employs a Bloom filter to determine whether the credential matches the key strokes.

5. The system of claim 4, wherein the credential component employs a Bloom filter prior to storing information in the protected credential store.

6. The system of claim 1, wherein the report comprises a hash of information associated with a page associated with the report.

7. The system of claim 1, wherein the protection component further prohibits submission of the credential to the site that is different than the domain name associated with the credential.

8. The system of claim 1, wherein the credential component performs a forward hash of key strokes of the data input by the user associated with the credential without buffering the key strokes.

9. The system of claim 1, wherein the report comprises a hash based, at least in part, upon one of a user ID, a password, the domain name, source code of a viewed web page, timestamp information from the security server, and a time of a previous login at a trusted site.

10. A phishing detection client component stored in memory having computer-executable instructions, which when executed by one or more processors, cause the one or more processors to perform operations comprising:
   storing information associated with a protected credential in a protected credential store, the information including at least a domain name of a trusted site and at least one user ID, the credential component having a maximum threshold quantity of user IDs with a particular password;
   determining that at least a portion of an attempted data input is associated with the protected credential stored in the protected credential;
   detecting that the portion of the attempted data input associated with the protected credential is directed to a site different than the domain name associated with the protected credential based at least in part on the determining; and
   allowing the submission of the attempted data input but preventing submission of the portion of the attempted data input which is associated with the protected credential when the site is different than the domain name associated with the protected credential.

11. The component of claim 10, further comprising:
   comparing a hash of the attempted data input with a hash of the protected credential to determine whether the attempted data input is the protected credential.

12. The component of claim 10, further comprising:
   comparing key strokes of the attempted data input with the protected credential.

13. The component of claim 10, further comprising:
   performing a forward hash of key strokes of the attempted data input associated with the protected credential.

14. A method facilitating phishing-attack detection, the method comprising:
- identifying, by a computing system configured to facilitate phishing-attack detection, entry of a yet-to-be authorized credential, the identifying comprising:
  - initializing a yet-to-be-authorized credential tree;
  - receiving a key stroke of the yet-to-be-authorized credential;
  - determining if the key stroke is a double entry or a backspace key;
  - in response to determining the received key stroke is the double entry or the backspace key, adding a branch to the yet-to-be-authorized credential tree;
  - determining a branch length on the yet-to-be-authorized credential tree;
  - in response to determining the branch length on the yet-to-be-authorized credential tree, eliminating any branch that exceeds a maximum yet-to-be-authorized credential length; and
  - computing a hash on the yet-to-be-authorized credential tree;
- determining whether a quantity of user IDs stored in the protected credential store with a particular password exceeds a defined threshold quantity of user IDs for the particular password;
- detecting automatic redirects in a given period of time, the automatic redirects being an operation employed by a phisher to redirect a user to a page unique to that user at a site not associated with the protected credential before entry of the protected credential is complete;
- providing a report on an attempted entry of the authorized protected credential at a site not associated with the authorized protected credential, the report including the automatic redirects in the given period of time;
- comparing the computed hash on the yet-to-be-authorized credential tree with a hash of the authorized protected credential;
- in response to the comparing, determining whether the yet-to-be-authorized credential is a protected credential;
- accessing a buffer of keystrokes to confirm that the yet-to-be-authorized credential was entered;
- determining whether the keystrokes of the buffer match the authorized protected credential; and
- in response to the determining whether the keystrokes of the buffer match the authorized protected credential or determining whether the yet-to-be authorized credential is a protected credential, storing information associated with the authorized protected credential in the protected credential store.

15. The system of claim 1, wherein the protection component detects automatic redirects during the entry of the data input.

16. The component of claim 10, wherein the means for allowing the submission provides a report related to the portion.

* * * * *